G. SNELL.
DRAFT HOOK.
APPLICATION FILED MAR. 27, 1909.
932,416.
Patented Aug. 24, 1909.
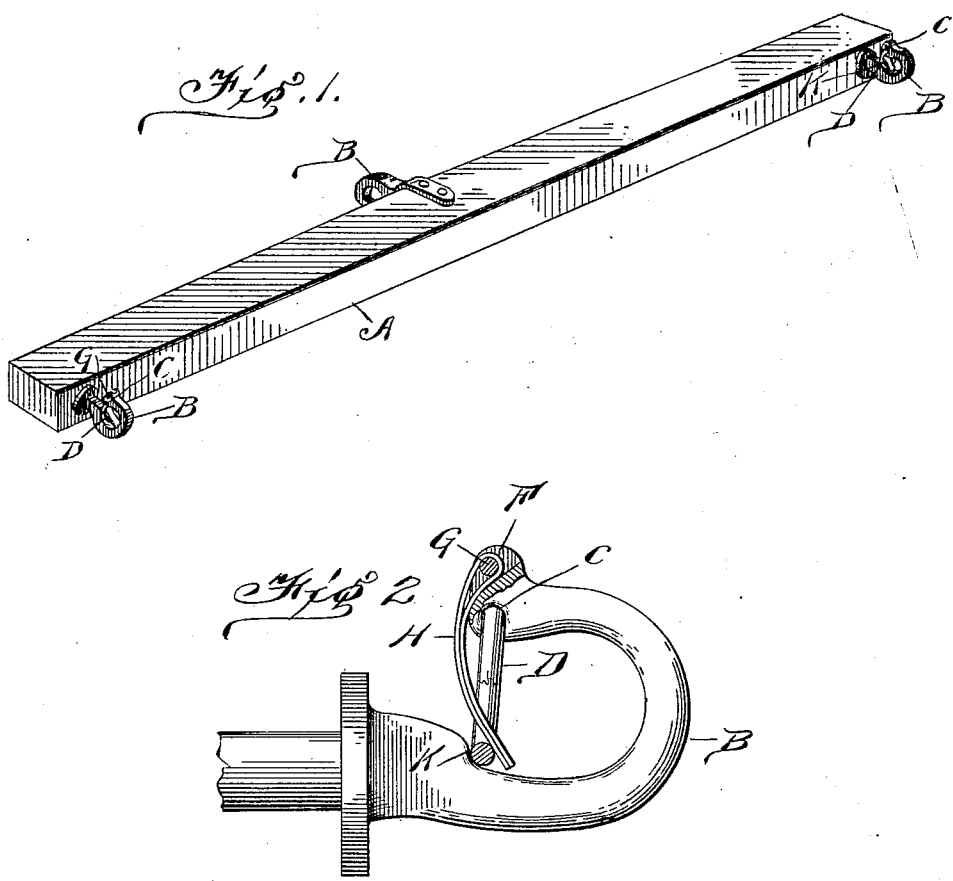
Witnesses
Inventor
George Snell.
By Franklin H. Hough
Attorney

UNITED STATES PATENT OFFICE.

GEORGE SNELL, OF THOMPSONVILLE, MICHIGAN.

DRAFT-HOOK.

932,416.　　　　　Specification of Letters Patent.　　Patented Aug. 24, 1909.

Application filed March 27, 1909. Serial No. 486,264.

*To all whom it may concern:*

Be it known that I, GEORGE SNELL, a citizen of the United States, residing at Thompsonville, in the county of Benzie and State of Michigan, have invented certain new and useful Improvements in Draft-Hooks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.
This invention relates to new and useful improvements in draft hooks especially adapted for use in connecting swingle trees to double trees and dispensing with the use of the ordinary clevis.
The invention comprises various details of construction, combinations and arrangements of parts which will be hereinafter fully described and then specifically defined in the appended claims.
My invention is illustrated in the accompanying drawings, in which:—

Figure 1 is a perspective view showing the application of the device to a double tree, and Fig. 2 is an enlarged detail view of the hook.

Reference now being had to the details of the drawings by letter, A designates a double tree and B designates hooks which are fastened thereto. Each hook is provided with an aperture C for the reception of a ring D. Each hook has a recess F formed in the outer edge thereof, and G designates a pivot pin passed through the walls of said recess and upon which a spring H is mounted, the ends of said spring extending through the ring and adapted to normally hold the same yieldingly against the bar K from which the hook projects, thus normally holding the hook closed. The ends of the spring, it will be noted, bear against the inner marginal edge of the hook and serve to prevent any ring or other connection upon the hook from becoming accidentally detached therefrom. When it is desired to release the hook from its connecting member, it may be done by simply raising the ring against the tension of the spring.

While I have shown my hook as applied to whiffle trees for connecting a swingle tree thereto, it will be understood that the hook may be utilized for various purposes.

What I claim to be new is:—

1. In combination with a hook having a recess at one end thereof, the bottom of which at one end is curved, a pin mounted in the walls of said recess, a link pivotally mounted at the end of the hook, a spring passed about said pin and fulcrumed over the curved portion of the bottom of said recess, then passed through said link and adapted to hold the same against the inner marginal edge of the hook.

2. In combination with a hook having a recess at one end thereof, the bottom of which at one end is curved, a pin mounted in the walls of said recess, a link pivotally mounted at the end of the hook, a spring passed about said pin and fulcrumed over the curved portion of the bottom of said recess, then passed through said link, the inner marginal edge of the hook opposite the pivotal point of the link having a shoulder against which said spring is adapted to hold the link.

In testimony whereof I hereunto affix my signature in the presence of two witnesses.

GEORGE SNELL.

Witnesses:
　CLINTON B. BELL,
　Mrs. M. G. PAUL.